W. R. BARDSLEY.
FILM PACK HOLDER AND ADJUSTER.
APPLICATION FILED DEC. 26, 1916.

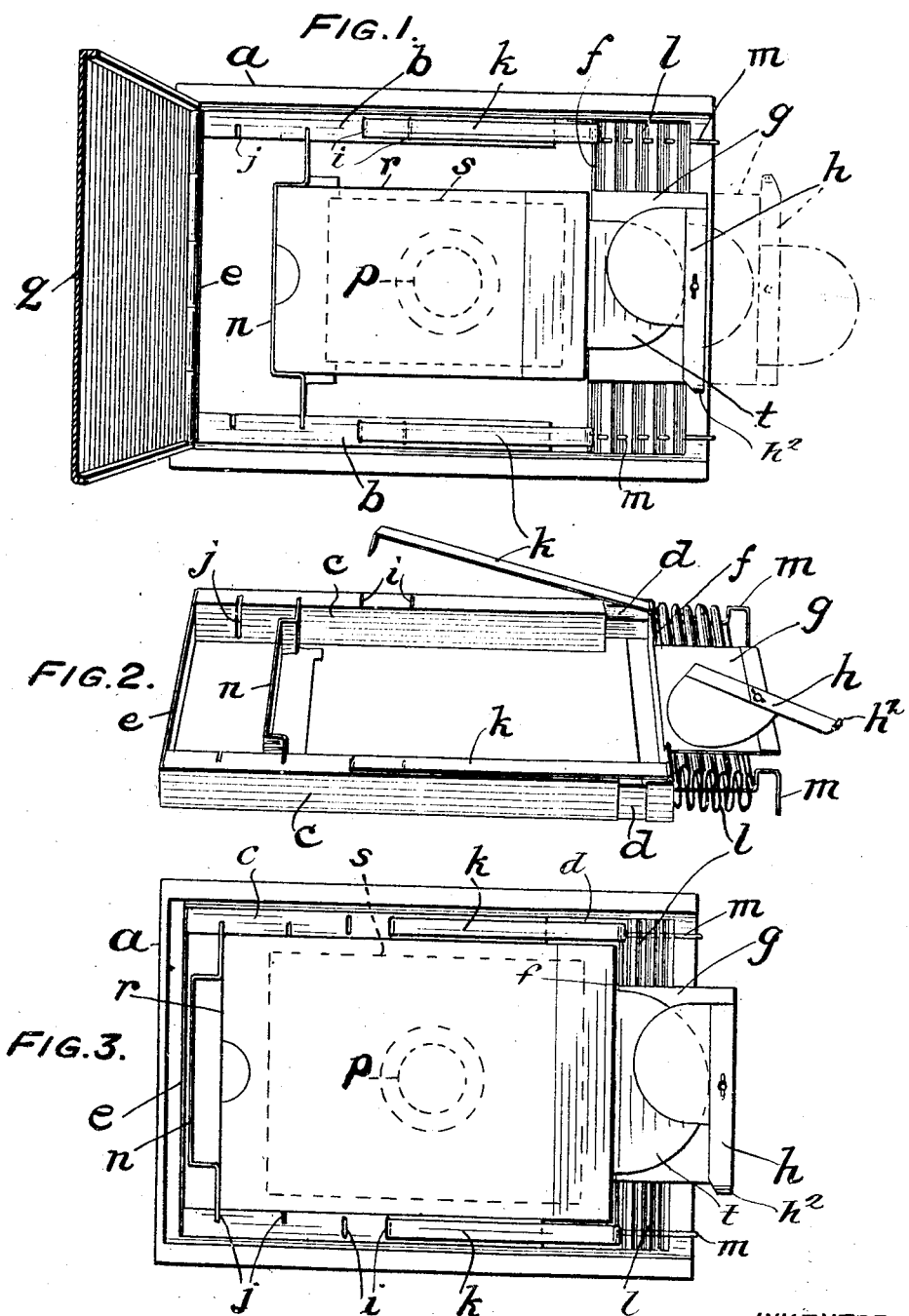

1,259,069.

Patented Mar. 12, 1918.
2 SHEETS—SHEET 2.

WITNESS:
R.P.Ritchel.

INVENTOR
Walter R. Bardsley
BY
Frank S. Busser
ATTORNEY.

UNITED STATES PATENT OFFICE.

WALTER R. BARDSLEY, OF PHILADELPHIA, PENNSYLVANIA.

FILM-PACK HOLDER AND ADJUSTER.

1,259,069.   Specification of Letters Patent.   Patented Mar. 12, 1918.

Application filed December 26, 1916. Serial No. 138,910.

*To all whom it may concern:*

Be it known that I, WALTER R. BARDSLEY, a citizen of the United States, residing at Philadelphia, county of Philadelphia, and State of Pennsylvania, have invented a new and useful Improvement in Film-Pack Holders and Adjusters, of which the following is a full, clear, and exact description, reference being had to the accompanying drawings, which form a part of this specification.

My invention relates to an adjustable holder for photographic film packs, whereby various sizes of film packs may be adapted to the same camera or film pack adapter and each size perfectly centered relatively to the lens, and which is at the same time so constructed as to permit of the ready withdrawal of the tabs, regardless of the size of the film pack used relative to that of the camera.

In the accompanying drawings, in which I show two embodiments of my invention:

Figure 1 is a rear elevation of a camera with pack holder and film pack in place;

Fig. 2 is a perspective view of the film pack holder;

Fig. 3 is a plan view of the film pack holder and film pack;

Referring to Figs. 1, 2 and 3, the film pack holder has the side pieces *b* composed of two telescoping members *c* and *d;* the end piece *e* which is suitably fastened to the members *c;* and the end piece *f* suitably fastened to the members *d* and having the extended portion *g* extending at right angles from its upper edge and to which is pivotally fastened the turnable catch *h*. The members *c* are provided on their top sides with the slots *i* and on their inner sides with the slots *j*. To the end piece *f* are pivotally fastened the hooks *k*, which are adapted to engage any pair of the slots *i*. To the top of the end piece *f* and behind the extended portion *g* is the plaited shield *l*, formed from a strip of black cloth folded upon itself, through which extend the guide wires *m* hooked at their front end to the wall of the camera. The rear ends of the guide wires slide through an opening in end piece into the side pieces *b*. The cross-bar *n*, having an offset portion equidistant from each end, is adapted to fit between the side pieces *b*, engaging with its ends any pair of the slots *j*.

The side pieces *c* are made substantially shorter than the camera or film pack adapter which the holder is designed to fit.

Referring to Fig. 1, the film pack holder is shown fitted to the camera body *a* having the lens *p* and the back *q*. The film pack *r* is held in the holder with the film *s* centered relative to the lens *p*. The tabs *t* lie upon the extended portion *g* and are held in place by the pivoted catch *h* due to the substantial shortness of the holder. The tabs are almost entirely within the camera body in the case of a large size film, and entirely within the camera body in the case of a small size film. In order to pull out the tabs, the extension *g* is pulled out, drawing the entire frame and film pack toward the top of the camera, exposing the extended portion *g* and the tabs *t* underlying the catch *h;* whereupon the catch *h* is turned on its pivot, and the tabs may be readily pulled out and torn off. It will be understood that no matter how far in the frame carrying the film pack is pushed, it can always readily be withdrawn by turning the catch *h* into a position approximating that shown in Fig. 2. The catch *h* has an upturned projection $h^2$ which affords a finger hold to facilitate sliding the frame into position to tear off the tabs, particularly where it is desired to apply a very small film pack to a comparatively large camera or adapter.

Figure 4:
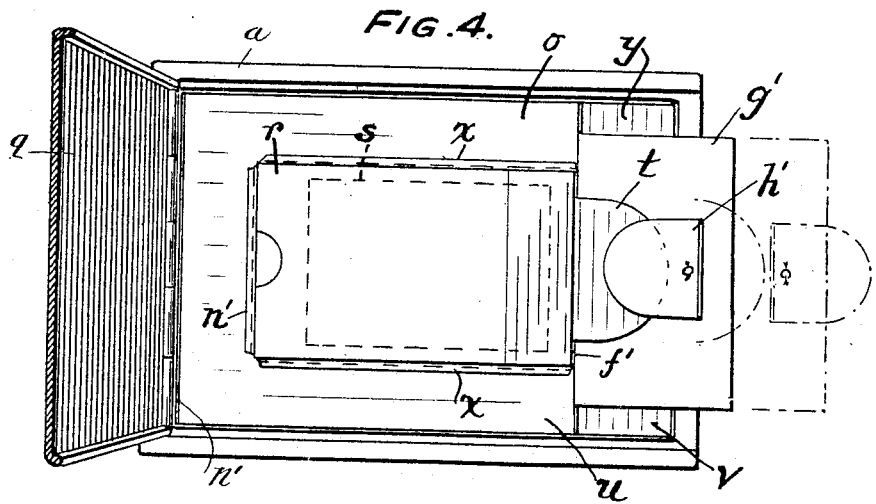
Fig. 4 is a rear elevation of a camera with a modified form of film pack holder applied thereto.
Figure 5:
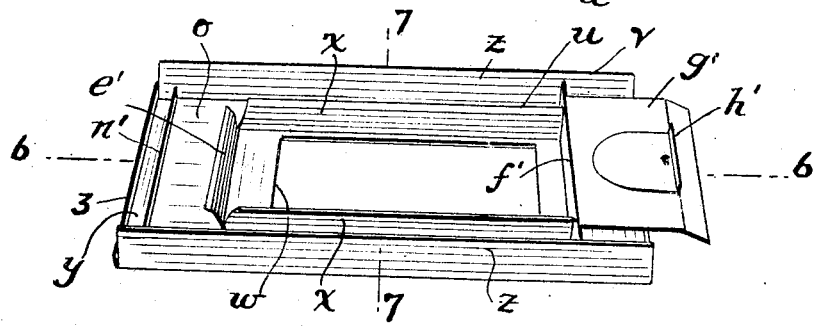
Fig. 5 is a perspective view of the modified form of holder shown in Fig. 4.
Figure 6:
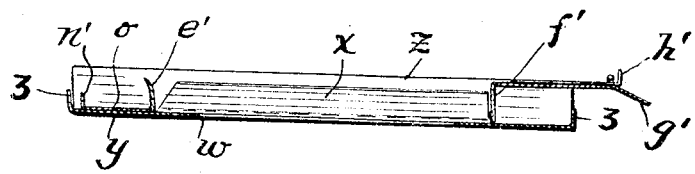
Fig. 6 is a longitudinal section on the line 6—6 of Fig. 5.
Figure 7:
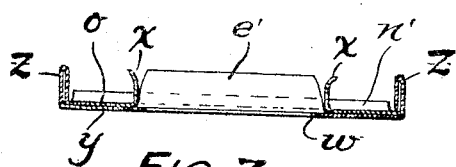
Fig. 7 is a transverse section on the line 7—7 of Fig. 5.

Referring to Figs. 4, 5, 6 and 7, which show a modification of my invention, the holder is made of relatively slidable members *u* and *v*. The piece *u* has the base *o* and the end pieces *n'* and *f'*, the end piece *f'* having the extended portion *g'* to which is pivoted the catch *h'*. The base has an aperture extending between the end pieces *e'* and *f'* and the side pieces *x*. The member *v* has the base *y* provided with the centrally located aperture *w*, the side pieces *z* and the end pieces 3.

The member *u* is substantially shorter than the member *v* and is adapted to be slidably mounted within the member *v*, the member *v* being made of a size corresponding to the size of the film pack adapter or camera with which it is intended for use.

Referring again to the modification shown in Figs. 1, 2, and 3: In practice, if the camera is constructed for a 3¼"x4¼" film pack, the holder is constructed so as to be adjustable for film packs of all sizes smaller than that for which the camera is constructed, beginning in this illustration with 2¼"x3¼". If it is desired to use a still smaller size (say) 1¾"x2⅜", the adjustable holder is shortened by releasing the hook k, further telescoping the members c and d, and engaging the hooks in the next slot. The piece n is then moved up a slot, the film pack placed in the holder with its lower end in the offset portion of the piece n, and the holder is then ready for insertion in the camera. In inserting the holder in the camera, the wire m is hooked to the camera wall, as hereinbefore described, outside the lines of the tabs. It will be observed that the described adjustment of the holder insures the perfect centering relative to the lens of film packs of various sizes. After the camera is closed, it is necessary before making each exposure, to withdraw the paper tab. In order to do this, the extension g of the end piece f is drawn out, whereby the holder and film pack are raised and the tabs exposed. The tab cover is then easily withdrawn. In order that no light may be admitted through the aperture through which the extension g extends, the shield l, of any dark colored material, is disposed between the aperture and the end of the holder.

Referring to the modification shown in Figs. 4, 5, 6 and 7, the practice is similar to that of the modification shown in Figs. 1, 2 and 3 except that the holder is designed for only one size of film pack. The holder is placed in the camera and when it is desired to withdraw the tabs, the member u is moved relatively to the member v by withdrawing the extended portion g', thus raising the film pack and exposing the tabs, so that they may be readily withdrawn.

The holder is adapted to be used with a film pack adapter used in connection with a camera using plates as well as with a camera adapted for film packs.

It will be understood that in the construction shown in Figs. 1, 2 and 3, the invention is not limited to any number of pairs of slots or any number of offsets in the piece n, these varying with the number of different sizes of film packs it is intended to accommodate.

Having now fully described my invention, what I desire to claim and protect by Letters Patent is:

1. In a film pack holder, the combination with a container, of a frame adapted for insertion within the container, film pack holding means carried by the frame and adapted to center the film when the frame is pushed in, said frame being of substantially less length than the length of the container and slidable within the container relatively thereto.

2. In a film pack holder, the combination with a container, of a frame adapted for insertion within the container, film pack holding means carried by the frame and adapted to center the film when the frame is pushed in, said frame being of substantially less length than the length of the container and slidable within the container relatively thereto, a projection at one end extending substantially beyond the frame, and a catch pivoted to said projection.

3. In a film pack holder, the combination with a container, of a frame slidable therein, and means carried by the frame and adjustable relatively thereto for positioning within the frame film packs of different sizes.

4. In a film pack holder, the combination with a container, of a frame adapted for insertion within the container, and an offset bar adjustably placed between the ends of the container adapted to support a film pack and center the film when the frame is pushed in, said frame being of substantially less length than the container and slidable within the container relatively thereto.

5. In a film pack holder, the combination of a frame adapted for insertion within the container and relatively slidable therein, said frame having a plurality of slots in the sides thereof, hooks pivoted to one of the ends of said frame and adapted to engage different pairs of slots, an offset cross-bar for centering a film pack in said frame and adapted to engage different pairs of slots, and a projection extending beyond the end of said frame.

6. In a film pack holder, the combination with a container, of a frame adapted for insertion within the container, film pack holding means carried by the frame and adapted to center the film when the frame is pushed in, said frame being of substantially less length than the length of the container and slidable within the container relatively thereto, a projection at one end extending substantially beyond the frame, and a catch pivoted to said projection, said catch including a plate adapted to overlie the tabs and an arm extending beyond the plate.

In testimony of which invention, I have hereunto set my hand, at Philadelphia, on this 21st day of December, 1916.

WALTER R. BARDSLEY.

Copies of this patent may be obtained for five cents each, by addressing the "Commissioner of Patents, Washington, D. C."